US012657240B2

(12) United States Patent
Belloni et al.

(10) Patent No.: US 12,657,240 B2
(45) Date of Patent: Jun. 16, 2026

(54) GRAPH WORKSPACES USING SYSTEM MANAGED INDEXES

(71) Applicant: SAP SE, Walldorf (DE)

(72) Inventors: Stefano Belloni, Mannheim (DE);
Christian Bensberg, Heidelberg (DE);
Alan Braenzel, Heidelberg (DE);
Gerald Franz, Wiesloch (DE);
Matthias Hauck, Frankfurt (DE);
Hannes Jakschitsch, Mannheim (DE);
Mathias Kemeter, Germersheim (DE);
Umang Rawat, Heidelberg (DE);
Roland Sedler, Ladenburg (DE);
Frank Tetzel, Heidelberg (DE)

(73) Assignee: SAP SE, Walldorf (DE)

( * ) Notice: Subject to any disclaimer, the term of this patent is extended or adjusted under 35 U.S.C. 154(b) by 22 days.

(21) Appl. No.: 18/917,594

(22) Filed: Oct. 16, 2024

(65) Prior Publication Data

US 2026/0105101 A1     Apr. 16, 2026

(51) Int. Cl.
*G06F 16/90*     (2019.01)
*G06F 16/901*     (2019.01)

(52) U.S. Cl.
CPC .............................. *G06F 16/9024* (2019.01)

(58) Field of Classification Search
CPC ............. G06F 16/9024; G06F 16/2246; G06F 16/9027; G06F 16/951; G06F 18/24323; G06F 16/2228; G06F 16/2255; G06F 16/901; G06F 16/322

USPC ........................................................ 707/741
See application file for complete search history.

(56) References Cited

U.S. PATENT DOCUMENTS

| | | | |
|---|---|---|---|
| 11,093,459 B2 * | 8/2021 | Arnaboldi ........... G06F 16/9024 |
| 11,354,302 B2 * | 6/2022 | Eberlein ............... G06F 16/212 |
| 2018/0218088 A1 | 8/2018 | Fischer et al. |
| 2021/0209104 A1 * | 7/2021 | Franz .................. G06F 16/9024 |

OTHER PUBLICATIONS

NPL "SAP HANA Graph Reference", pp. 1-20, Document Version: 1.1—published 2021.*
SAP_HANA_Graph_Reference, pp. 1-20, Document Version: 1.1—Jul. 9, 2021 (Year: 2021).*
"European Application Serial No. 25207470.3, Extended European Search Report mailed Mar. 10, 2026", 8 pgs.

\* cited by examiner

*Primary Examiner* — Hicham Skhoun
(74) *Attorney, Agent, or Firm* — SCHWEGMAN LUNDBERG & WOESSNER, P.A.

(57) ABSTRACT

Systems and methods described herein relate to automatic creation and management of indexes for graph workspaces. Missing indexes for a graph workspace are identified and automatically created as appropriate. The automatically created indexes are reused for other graph workspaces working on the same set of data. The automatic creation and management of indexes for graph workspaces allows for a graph workspace to be created with a single user command instead of multiple user commands involving creation of indexes prior to creation of the graph workspace.

20 Claims, 10 Drawing Sheets

130

GRAPH WORKSPACE SYSTEM

202 — CREATION MODULE

MANAGEMENT MODULE — 204

206 — REPLACEMENT MODULE

EXPORT/ IMPORT MODULE — 208

210 — METADATA MODULE

PRIVILEGES MODULE — 212

300

302

USER A

304

USER B

306

GRAPH WORKSPACE SYSTEM

308

DATA COLLECTION

310

HASH INDEX

312

ADJACENCY INDEX

314

GRAPH WORKSPACE A

316

GRAPH WORKSPACE B

400

Figure 5A:
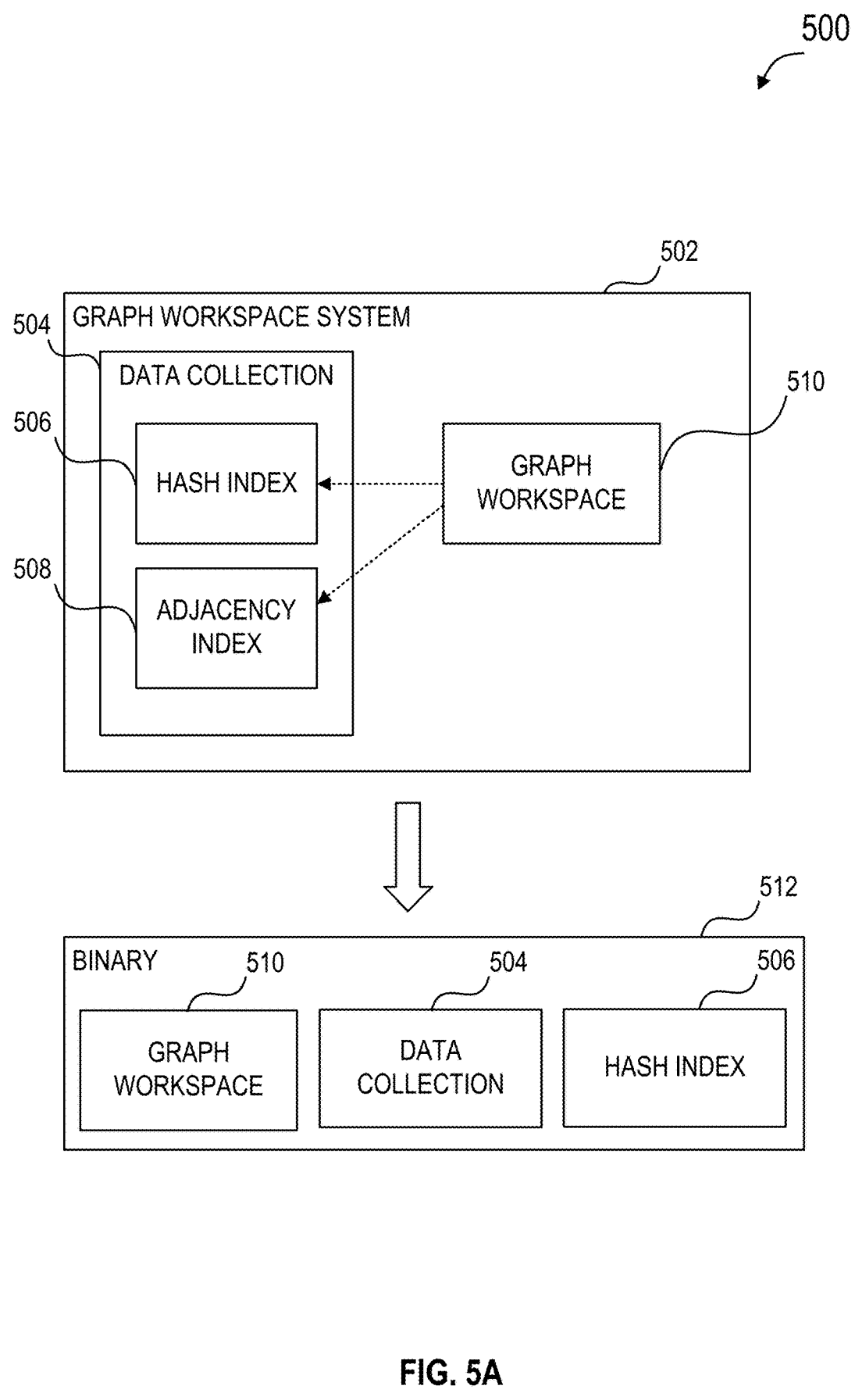

500

502

GRAPH WORKSPACE SYSTEM

504

DATA COLLECTION

506

HASH INDEX

510

GRAPH WORKSPACE

508

ADJACENCY INDEX

512

BINARY

510
GRAPH WORKSPACE

504
DATA COLLECTION

506
HASH INDEX

CREATE COLLECTION

604

CREATE GRAPH WORKSPACE

606

EXISTING INDEXES?

YES

NO

608

USE EXISTING INDEXES

610

AUTOMATICALLY CREATE INDEXES

612

GRAPH WORKSPACE CREATED

614

MANAGE GRAPH WORKSPACE

616

QUERY/ANALYZE GRAPH DATA

618

UPDATE GRAPH WORKSPACE

620

DROP GRAPH WORKSPACE

624

EXPORT/IMPORT GRAPH WORKSPACE

650

652

RECEIVE A USER COMMAND TO CREATE A GRAPH WORKSPACE FOR A SET OF DATA

654

DETERMINING A MISSING INDEX ON THE SET OF DATA FOR THE GRAPH WORKSPACE

656

AUTOMATICALLY CREATE AN AUTOMATICALLY CREATED INDEX ON THE SET OF DATA FOR THE GRAPH WORKSPACE BASED ON THE MISSING INDEX

658

CREATE THE GRAPH WORKSPACE REFERENCING THE AUTOMATICALLY CREATED INDEX

GRAPH WORKSPACES USING SYSTEM MANAGED INDEXES

TECHNICAL FIELD

The subject matter described herein generally relates to database technology. More specifically, but not exclusively, the subject matter described herein relates to automatic creation and management of graph workspaces and associated indexes.

BACKGROUND

Graph workspaces in database systems provide sophisticated capabilities for processing data, allowing users to perform analysis of complex networks. For example, graph workspaces are used to map complex routing networks, such as supply chains, and to identify bottlenecks optimize routes, and improve overall efficiency of these complex routing networks. Graph workspaces are also used to model and analyze social networks and to identify patterns of interaction in these social networks. However, with continuing improvements in computer technology, the data for which graph workspaces are utilized grows increasingly complex. Thus, there is a continuing need for technical improvements in database technology to address these technical challenges.

BRIEF DESCRIPTION OF THE DRAWINGS

Some examples are shown for purposes of illustration and not limitation in the figures of the accompanying drawings. In the drawings, which are not necessarily drawn to scale, like numerals may describe similar components in different views or examples. It should be understood that additional and alternative examples are possible without departing from the principles of the subject matter described herein.

FIGS. 5A-5B are block diagrams showing examples of exporting and importing a graph workspace, according to some examples.

DETAILED DESCRIPTION

Figure 1:
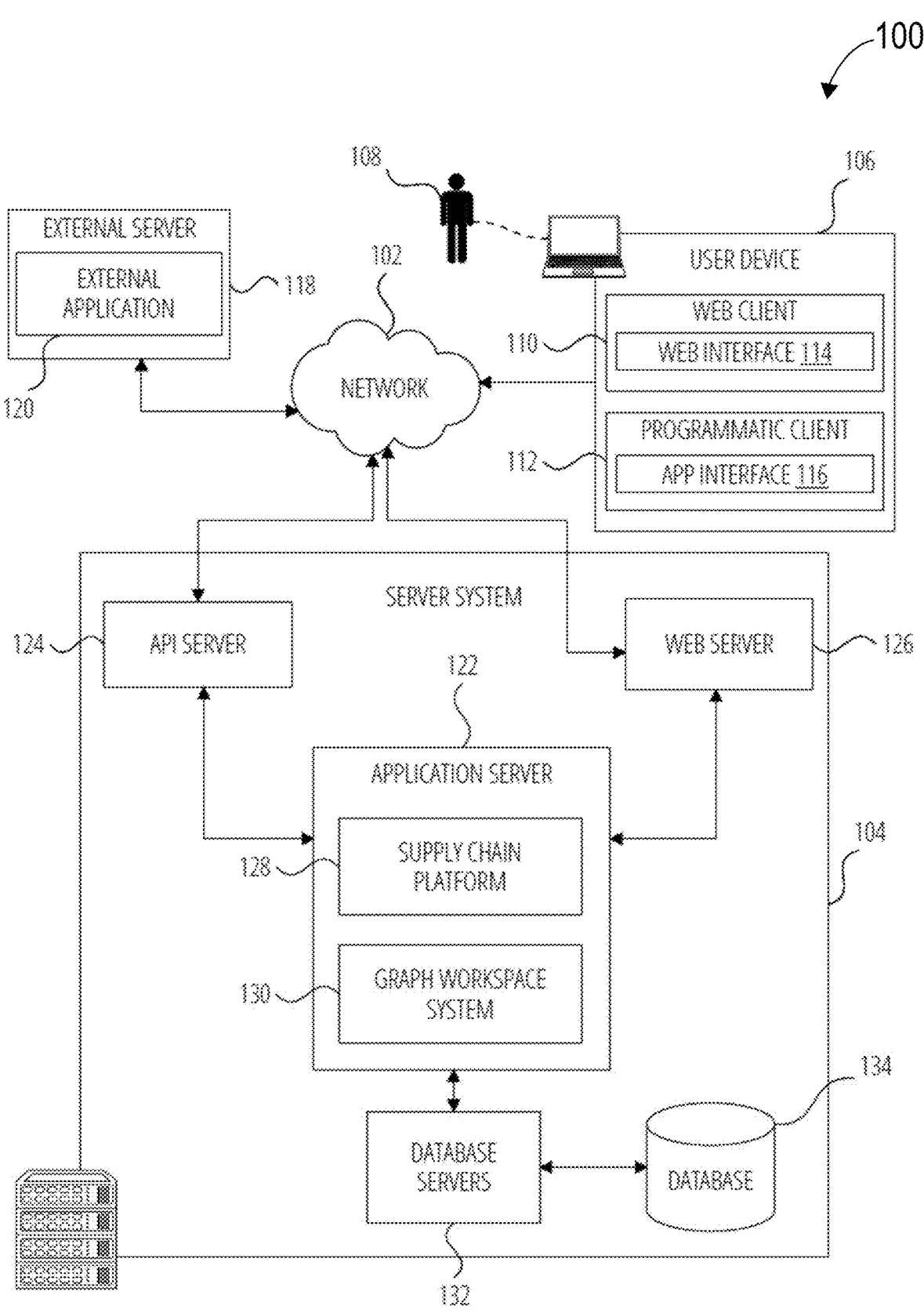
FIG. 1 diagrammatically illustrates a network environment that includes a graph workspace system, according to some examples.

In general, a graph workspace is a catalog object (e.g., database object) that represents an interconnected set of data (e.g., data collection, data table) within a database. The graph workspace provides a structured representation of the set of data using vertices and edges to represent the data. By providing this structured representation, the graph workspace supports various graph analytics capabilities, such as performing traversals and analyzing relationships. To take advantage of these graph analytics capabilities, a graph workspace is created based on a hash index (e.g., vertices index) and an adjacency index (e.g., edges index), and these indexes support the graph analytics capabilities of the graph workspace. Because the graph workspace is created based on the hash index and the adjacency index, an attempt to create the graph workspace before the hash index and the adjacency index are created will fail. Similarly, because the hash index and the adjacency index support the graph analytics capabilities of the graph workspace, if the hash index or the adjacency index is dropped or deleted, the graph workspace based on the hash index or the adjacency index becomes invalidated (e.g., non-functional). Thus, database technologies using graph workspaces face technical challenges arising from their dependence of graph workspaces on hash indexes and adjacency indexes.

The subject matter described herein addresses these and other technical challenges arising in the field of database technologies. As an overview, the subject matter described herein provides for automatic creation and management of indexes for graph workspaces. The automatic creation and management of indexes for graph workspaces allows for a graph workspace to be created with a single user command instead of multiple user commands involving creation of a hash index and an adjacency index prior to creation of the graph workspace. Thus, by providing for automatic creation and management of indexes, database technologies are improved by preventing failures in graph workspace creation and increasing ease of use.

In some examples, a graph workspace system identifies existing indexes (e.g., user created indexes) for a data collection in response to a user command to create a graph workspace for the data collection, and the graph workspace system automatically creates indexes accordingly. For example, the graph workspace system receives a user command to create a graph workspace for a data collection. In response, the graph workspace system identifies whether a hash index and an adjacency index have been created for the data collection. In this example, the hash index has already been created for the data collection but not the adjacency index. Based on the adjacency index not being created for the data collection, the graph workspace system automatically creates the adjacency index. The graph workspace is created using the hash index and the automatically created adjacency index. As this example illustrates, automatic creation of indexes advantageously prevents failures in graph workspace creation while avoiding creation of extraneous indexes.

In some examples, automatically created indexes (e.g., system indexes) for a graph workspace are reused for creation of subsequent graph workspaces. For example, a first graph workspace for a data collection is created in response to a first user command to create the first graph workspace. In this example, a hash index and an adjacency index have not been created. The hash index and the adjacency index are automatically created in response to the user command to create the first graph workspace. A second graph workspace for the data collection is created in response to a second user command to create the second graph workspace. Since the first graph workspace and the second graph workspace are created for the same collection, the second graph workspace can be created referencing the automatically created hash index and the automatically created adjacency index. As this example illustrates, through automatic creation and management of indexes, indexes are automatically created and reused for graph workspaces, improving use of computing resources.

In some examples, automatically created indexes (e.g., system indexes) for a graph workspace are automatically dropped in response to the graph workspace for which the indexes were created being dropped and based on a number of graph workspaces referencing the automatically created indexes. For example, a hash index and an adjacency index are automatically created in response to a user command to create a graph workspace for a data collection. When the graph workspace is dropped, an identification of graph workspaces that reference the automatically created hash index and the automatically created adjacency index is made. If the number of graph workspaces referencing the automatically created hash index and the automatically created adjacency index is less than a threshold number (e.g., one), the automatically created hash index and the automatically created adjacency index are automatically dropped. For example, if the number of graph workspaces referencing the automatically created hash index and the automatically created adjacency index is zero, then no graph workspaces reference the automatically created hash index and the automatically created adjacency index. As this example illustrates, through automatic creation and management of indexes, indexes are automatically created and automatically dropped, freeing up computing resources that would otherwise be unused.

In some examples, a graph workspace system facilitates replacing a graph workspace created for a first data collection with the same graph workspace created for a second data collection. For example, a graph workspace is created for a first data collection in response to a first user command to create the graph workspace. To facilitate creation of the graph workspace, the graph workspace system identifies whether a hash index and an adjacency index for the first data collection have been created. In this example, no hash index and no adjacency index have been created. Accordingly, the graph workspace system automatically creates the hash index and the adjacency index. The graph workspace is created referencing the automatically created hash index and the automatically created adjacency index. Subsequently, the graph workspace is replaced in response to a second user command to create the graph workspace for a second data collection. To facilitate replacement of the graph workspace, the graph workspace system identifies whether a hash index and an adjacency index for the second data collection has been created and automatically creates the hash index and the adjacency index as appropriate. Furthermore, the graph workspace system identifies whether the automatically created hash index and the automatically created adjacency index for the first data collection are referenced by any other graph workspaces and drops the automatically created hash index and the automatically created adjacency index for the first data collection as appropriate. The graph workspace is replaced referencing a hash index and an adjacency index for the second data collection. As this example illustrates, by managing automatically created indexes, the graph workspace system optimizes use of computing resources by automatically creating and dropping indexes as they are used.

In some examples, a graph workspace system manages the indexes used by a graph workspace for export operations of the graph workspace and for import operations of the graph workspace. For example, a first user exports a graph workspace that references a hash index that was created in response to a user command and an adjacency index that was automatically created. In this example, the hash index and the graph workspace are exported without the automatically created adjacency index. Doing so avoids imparting user privileges to an automatically created object or providing an object that cannot be dropped due to lack of user privileges. When a second user imports the graph workspace and the hash index, the adjacency index that was not exported is automatically created. As this example illustrates, automatically created indexes are managed in export operations and import operations to maintain clear user privileges over objects, avoiding situations that may result in lost computing resources. Further details related to the automatic creation and management of indexes for graph workspaces is provided herein.

FIG. 1 is a diagrammatic representation of a networked computing environment 100 in which some examples of the present disclosure may be implemented or deployed. One or more servers in a server system 104 provide server-side functionality via a network 102 to a networked device, in the example form of a user device 106 that is accessed by a user 108. A web client 110 (e.g., a browser) or a programmatic client 112 (e.g., an "app") may be hosted and executed on the user device 106.

An Application Program Interface (API) server 124 and a web server 126 provide respective programmatic and web interfaces to components of the server system 104. A specific application server 122 hosts a supply chain platform 128 and a graph workspace system 130, each of which includes components, modules, or applications. It is noted that the supply chain platform 128 and the graph workspace system 130 can be hosted via separate application servers in some examples.

The user device 106 can communicate with the application server 122, such as via the web interface supported by the web server 126 or via the programmatic interface provided by the API server 124. It will be appreciated that, although only a single user device 106 is shown in FIG. 1, a plurality of user devices may be communicatively coupled to the server system 104 in some examples. Further, while certain functions may be described herein as being performed at either the user device 106 (e.g., web client 110 or programmatic client 112) or the server system 104, the location of certain functionality either within the user device 106 or the server system 104 may be a design choice. Furthermore, while certain functions may be described herein as being performed at a particular system, such as the graph workspace system 130, the location of the functionality may also be a design choice. For instance, some functionality described with reference to the graph workspace system 130 can be performed by the supply chain platform 128 or by both the graph workspace system 130 and the supply chain platform 128.

The application server 122 is communicatively coupled to database servers 132, facilitating access to one or more information storage repositories, such as a database 134. In some examples, the database 134 includes storage devices that store information to be accessed, processed, modified, or deleted by the supply chain platform 128 or the graph workspace system 130.

The application server 122 accesses application data (e.g., application data stored by the database servers 132) to provide one or more applications or software tools to the user device 106 via a web interface 114 or an app interface 116. The supply chain platform 128 is an example of a platform with one or more applications or software tools, provided via the application server 122.

The supply chain platform 128 can facilitate the tracking, coordination, and execution of supply chain activities (e.g., ranging from procurement to distribution). In some examples, the supply chain platform 128 allows organizations to streamline and digitize their procurement lifecycle using a cloud-based architecture, integrating with the database 134 for fast processing of large datasets and real-time insights. Various data objects are created and used to manage and operate the supply chain platform 128. For example, various data objects, corresponding to real-world business entities or objects, can be mapped to tables in the database 134, and such tables (and thus their data objects) can be interconnected based on hierarchies, dependencies, or references.

In some examples, the supply chain platform 128 integrates with other systems to enhance functionality, such as interfacing with the graph workspace system 130. For instance, the supply chain platform 128 may utilize the graph workspace system 130 to provide graph analytics capabilities.

In some examples, the graph workspace system 130 is a system configured to create graph workspaces for sets of data within the database 134. The graph workspace system 130 automatically creates indexes to facilitate creation of the graph workspaces. The graph workspace system 130 manages the automatically created indexes and the graph workspaces in, for example, creation operations, drop operations, export operations, and import operations.

For example, the graph workspace system 130 handles requests to create graph workspaces for data collections within the database 134. In some examples, the supply chain platform 128 and the graph workspace system 130 work together to process user commands to create graph workspaces, create indexes, export graph workspaces, import graph workspaces, drop graph workspaces, and drop indexes.

It is noted that the supply chain platform 128 is merely an example of a platform or system that can benefit from features of the graph workspace system 130. The graph workspace system 130 can, for instance, operate to create and manage graph workspaces and indexes for other platforms or systems, such as human resources systems, enterprise resource planning (ERP) systems, or accounting systems.

In some examples, the application server 122 is part of a cloud-based platform provided by a software provider that allows the user 108 to utilize the tools of the supply chain platform 128, the graph workspace system 130, and, where applicable, other systems or subsystems (e.g., a human resources system, ERP system, or accounting system, as mentioned).

One or more of the application servers 122, the database servers 132, the API server 124, the web server 126, and the supply chain platform 128 may each be implemented in a computer system, in whole or in part, as described below with respect to FIG. 8. In some examples, external applications (which may be third-party applications or other applications provided by the same software provider), such as an external server 118 executing on an external application 120, can communicate with the application server 122 via the programmatic interface provided by the API server 124. For example, a third-party application may support one or more features or functions on a website or platform hosted by a third party or may perform certain methodologies and provide input or output information to the application server 122 for further processing.

The network 102 may be any network that enables communication between or among machines, databases, and devices. Accordingly, the network 102 may be a wired network, a wireless network (e.g., a mobile or cellular network), or any suitable combination thereof. The network 102 may include one or more portions that constitute a private network, a public network (e.g., the Internet), or any suitable combination thereof.

Figure 2:
FIG. 2 is a block diagram of components of a graph workspace system, according to some examples.

FIG. 2 is a block diagram illustrating components of the graph workspace system 130 of FIG. 1, according to some examples. In FIG. 2, the graph workspace system 130 is shown to include a creation module 202, a management module 204, a replacement module 206, an export/import module 208, a metadata module 210, and a privileges module 212.

The creation module 202 is responsible for creating graph workspaces and creating indexes referenced by the graph workspaces. In general, a graph workspace is a catalog object that represents a set of data (e.g., data collection, data table) for performing graph analytics. The graph workspace references a hash index (e.g., vertex index, vertex table) that identifies the vertices in the set of data for the graph workspace. The graph workspace references an adjacency index (e.g., edge index, edge table) that identifies the connections (e.g., edges) between the adjacent vertices in the set of data. The adjacency index references the hash index for the vertices in the set of data. The adjacency index identifies edges between the adjacent vertices in the set of data using references to source vertices and references to target vertices in the set of data, with each edge being defined as an edge between a source vertex and a target vertex. As the graph workspace references the hash index and the adjacency index, the hash index and the adjacency index are prerequisites for creating the graph workspace.

In some examples, the creation module 202 receives a user command to create a graph workspace and creates the graph workspace in response to the user command. For example, the user command can include a name for the graph workspace, a data collection identifier for a data collection for which the graph workspace is to be created, a hash index identifier for a hash index containing vertex data for the graph workspace, an adjacency index identifier for an adjacency index containing edge data for the graph workspace, a source vertex identifier containing references to source vertices within the vertex data, a target vertex identifier containing references to target vertices within the vertex data, and a type identifier identifying the type of information for the edges and the vertices of the graph workspace. For example, a user command to create a graph workspace is:

```
CREATE GRAPH WORKSPACE S2.WS
                    COLLECTION S1.COLL
                             VERTEX
                          KEY "uid1"
                               EDGE
                          KEY "uid2"
                        SOURCE "src"
                        TARGET "tgt"
                          TYPE "typ";
``` where "S2.WS" is a name for the graph workspace, "S1.COLL" is a data collection identifier, "uid1" is a hash index identifier, "uid2" is an adjacency index identifier, "src" is a source vertex identifier, "tgt" is a target vertex identifier, and "typ" is a type identifier. Here, the example user command is a single statement to create a graph workspace.

In response to the user command to create the graph workspace, the creation module 202 identifies a hash index and an adjacency index based on the hash index identifier, the adjacency index identifier, the source vertex identifier, the target vertex identifier, and the type identifier. If an existing hash index (e.g., hash index created by a user, automatically created hash index) corresponding with the hash index identifier and the type identifier has been created, the graph workspace references the existing hash index. If an existing adjacency index (e.g., adjacency index created by a user, automatically created adjacency index) corresponding with the adjacency index identifier, the source vertex identifier, the target vertex identifier, and the type identifier has been created, the graph workspace references the existing adjacency index. If no hash index corresponding with the hash index identifier and the type identifier has been created, a hash index is automatically created for the graph workspace to reference. If no adjacency index corresponding with the adjacency index identifier, the source vertex identifier, the target vertex identifier, and the type identifier has been created, an adjacency index is automatically created for the graph workspace to reference.

The creation module 202 creates a hash index or an adjacency index using a naming scheme that identifies the hash index or the adjacency index as automatically created indexes. For example, an automatically created hash index has a prefix "_SYS_HASH_INDEX_". An automatically created adjacency index has a prefix "_SYS_ADJACEN-CY_INDEX_". The naming scheme allows graph workspace system 130 to identify automatically created indexes as system indexes without attaching additional metadata to the automatically created indexes. In some examples, users are prevented from creating indexes that follow the naming scheme. Thus, the naming scheme clearly identifies which indexes are created in response to user commands and which indexes are automatically created.

In some examples, users are prevented from directly referencing automatically created indexes. For example, a user creating a graph workspace is prevented from referencing automatically created indexes in the user command to create the graph workspace. For example, a user is prevented from using a drop command to drop an automatically created index. This allows the graph workspace system 130 to maintain control over the automatically created indexes.

In some examples, graph workspaces, indexes, and data collections can belong to different schemas. In general, a schema is a namespace for organizing database objects that are related. For example, a graph workspace created in response to a user command belongs to a user-defined schema. The data collection for which the graph workspace is created belongs to a different user-defined schema. Automatically created indexes created in response to the user command belong to the schema of the data collection on which the graph workspace is created.

the owner of the data collection on which the automatically created index was created is assigned as the owner of the automatically created index. This links the automatically created index with the data collection so that, for example, if the owner of the data collection drops the data collection, any automatically created indexes created on the data collection are also dropped. If the owner of the data collection is dropped, all the database objects belonging to the user including automatically created indexes are dropped.

In some examples, the number of hash indexes and the number of adjacency indexes that are created for a data collection is limited to a threshold number (e.g., one). For example, only one hash index and only one adjacency index are allowed for one data collection. A graph workspace created for the data collection will use an existing hash index created for the data collection or use an automatically created hash index for the data collection if there is no existing hash index. The graph workspace will use an existing adjacency index created for the data collection or use an automatically created adjacency index for the data collection if there is no existing adjacency index. In this example, there is a threshold of one hash index and one adjacency index allowed for the data collection. So, all users who create graph workspaces for the collection use the same hash index and the same adjacency index.

The management module 204 is responsible for maintaining indexes for graph workspaces. In some examples, automatically created indexes for a data collection are used by multiple graph workspaces. For example, a hash index and an adjacency index for a data collection are automatically created in response to a first user command from a first user to create a first graph workspace for the data collection. The hash index and the adjacency index are automatically created based on a determination that there is not an existing hash index for the data collection and that there is not an existing adjacency index for the data collection. In this example, a second graph workspace for the data collection is created in response to a second user command from a second user that does not have privileges to access the first graph workspace and is unaware of the first graph workspace. The automatically created hash index and the automatically created adjacency index are identified as the existing hash index for the data collection and the existing adjacency index for the data collection. The second graph workspace is created referencing the automatically created hash index and the automatically created adjacency index. As illustrated in this example, the management module 204 prevents redundant creation of indexes, improving use of computing resources.

In some examples, automatically created indexes are deleted or dropped when all of the graph workspaces referencing the automatically created indexes are dropped. For example, a first graph workspace and a second graph workspace use the same automatically created hash index and the same automatically created adjacency index for a data collection. The first graph workspace is dropped in response to a user command to drop the first graph workspace. When the first graph workspace is dropped, the automatically created hash index and the automatically created adjacency index are checked to determine whether any graph workspaces reference the automatically created hash index or the automatically created adjacency index. In this example, a determination is made the second graph workspace is referencing the automatically created hash index and the automatically created adjacency index. Based on this determination, the automatically created hash index and the automatically created adjacency index are preserved when the first graph workspace is dropped. Continuing this example, the second graph workspace is dropped in response to a user command to drop the second graph workspace. When the second graph workspace is dropped, the automatically created hash index and the automatically created adjacency index are checked to determine whether any graph workspaces reference the automatically created hash index or the automatically created adjacency index. Here, a determination is made that after the second graph workspace is dropped, no graph workspaces reference the automatically created hash index and the automatically created adjacency index. Based on this determination, the automatically created hash index and the automatically created adjacency index are dropped when the second graph workspace is dropped.

In some examples, the management module 204 determines whether an automatically created index for a data collection is being referenced by a graph workspace for the collection by iterating through data objects defined for the data collection. For example, when a graph workspace for a data collection is dropped, the management module 204 iterates through metadata for the data collection to identify other graph workspaces defined for the data collection. For each such graph workspace, a determination is made as to whether the graph workspace uses the automatically created hash index or the automatically created adjacency index created for the graph workspace. For each graph workspace that uses an automatically created index, a counter for the automatically created index is incremented. A counter of one or more after iterating through each graph workspace indicates the automatically created index is in use. A counter of zero after iterating through each graph workspace indicates the automatically created index is no longer in use. The automatically created index can be dropped when the counter associated with the automatically created index is zero after iterating through the graph workspaces of the data collection for which the automatically created index was created. By iterating through graph workspaces when a graph workspace is dropped, a persistent counter does not need to be maintained for each automatically created index. In some examples, a persistent counter is maintained for each automatically created index to reduce use of computing resources at the cost of maintaining additional metadata. In situations where a system is updated to support additional metadata, a metadata migration operation may be involved.

In some examples, the management module 204 locks a data collection on which an automatically created index is created. The data collection is locked to prevent modification to the data collection that my result in potential deadlocks leading to failed data definition language statements. Once the index is created, the data collection is unlocked and can be modified.

The replacement module 206 is responsible for replacing a graph workspace to work on a different data collection. A graph workspace is replaced in response to a user command to create a graph workspace using a name of an existing graph workspace. The created graph workspace replaces the existing graph workspace. For example, a user provides a user command to create a graph workspace with a name of an existing graph workspace for a first data collection. The user command includes a data collection identifier specifying a second data collection. In response to the user command, the graph workspace for the second data collection is created. A hash index for the second data collection is automatically created if the second data collection does not have an existing hash index. An adjacency index for the second data collection is automatically created if the second data collection does not have an existing adjacency index. The graph workspace for the second data collection is created referencing the automatically created hash index and the automatically created adjacency index. The graph workspace for the first data collection is dropped in response to the user command. If the graph workspace for the first data collection references an automatically created hash index and no other graph workspaces reference the automatically created hash index, the automatically created hash index is dropped. If the graph workspace for the second data collection references an automatically created adjacency index an no other graph workspaces reference the automatically created adjacency index, the automatically created adjacency index is dropped.

The export/import module 208 is responsible for exporting graph workspaces and importing graph workspaces. In some examples, automatically created indexes are not exported with an exported graph workspace. User created indexes and other base objects (e.g., data collection) are exported with the exported graph workspace. Preventing the automatically created indexes from being exported avoids a situation where users import indexes that they cannot drop. For example, a user provides a user command to create a graph workspace on a data collection with no existing hash index and no existing adjacency index. A hash index and an adjacency index are automatically created in response to the user command. The graph workspace is created referencing the automatically created hash index and the automatically created adjacency index. In this example, the user provides a user command to export the graph workspace. The graph workspace and the data collection for which the graph workspace was created are exported in response to the user command. The automatically created hash index and the automatically created adjacency index are not included in (e.g., excluded from) the export.

As automatically created indexes are not exported with (e.g., excluded from) an exported graph workspace, indexes are automatically created for imported graph workspaces with missing indexes. The automatically created indexes are managed by the system that imported the imported graph workspaces and are able to drop the automatically created indexes when the automatically created indexes are no longer in use (e.g., the imported graph workspaces are dropped). For example, a graph workspace that references an automatically created hash index and an automatically created adjacency index is exported to a system. In this example, the graph workspace and a data collection for which the graph workspace is created are exported to the system. The automatically created hash index and the automatically created adjacency index are not exported to the system. The system imports the graph workspace and the data collection. Here, there is no hash index and no adjacency index for the data collection, so the system automatically creates a hash index and an adjacency index for the data collection. The imported graph workspace references the automatically created hash index and the automatically created adjacency index.

The metadata module 210 is responsible for identifying and providing access to metadata associated with graph workspaces. For example, metadata for a graph workspace includes:

Entity Type: Specifies the type (e.g., vertex, edge) of entity in a graph workspace;

Entity Schema Name: Specifies the name of the schema where an entity table is located;

Entity Table Name: Specifies the name of the entity table containing vertex data or edge data;

Entity Column Name: Specifies the name of the column in the entity table;

Entity Role: Specifies the role of the column in the graph workspace (e.g., key, source, target, type);

Referenced Schema Name: Specifies the schema name of the referenced vertex table by the edge table for the source and target vertices;

Referenced Table Name: Specifies the name of the referenced vertex table by the edge table for the source and target vertices.

In some examples, the metadata associated with graph workspaces referencing user created indexes is the same as the metadata associated with graph workspaces referencing automatically created indexes. That is, the graph workspaces referencing automatically created indexes do not use additional metadata to track the dependencies of the automatically created indexes. By following a naming scheme for automatically created indexes and iterating through the metadata when graph workspaces are dropped, the automatically created indexes are maintained and dropped when no longer in use.

The privileges module 212 is responsible for processing user commands for creation of graph workspaces in accordance with user privileges. In some examples, a user command to create a graph workspace for a collection is denied if the user who provided the user command does not have user privileges to create indexes on the collection. This prevents users who do not have user privileges to create indexes for the collection from causing an automatically created index to be created for the collection. In some examples, a user command to drop a graph workspace for a collection is denied if the user who provided the user command does not have user privileges to drop indexes on the collection. This prevents users who do not have user privileges to drop indexes for the collection from causing an automatically created index to be dropped for the collection. In some examples, a user command to replace a graph workspace for a collection is denied if the user who provided the user command does not have user privileges to drop indexes. This prevents a situation where a graph workspace is dropped due to being replaced but the automatically created indexes referenced by the graph workspace are not dropped.

In some examples, at least some of the components shown in FIG. 2 are configured to communicate with each other to implement aspects described herein. One or more of the components described herein may be implemented using hardware (e.g., one or more processors of one or more machines) or a combination of hardware and software. For example, a component described herein may be implemented by a processor configured to perform the operations described herein for that component. Moreover, two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

In some examples, certain components or subsystems shown in FIG. 1 or FIG. 2 are implemented (individually or jointly) as microservices. A microservice subsystem (e.g., a microservice application) may have components that enable it to operate independently and communicate with other services. Example components of a microservice subsystem include:

Function logic: The function logic implements the functionality of the microservice subsystem, representing a specific capability or function that the microservice provides.

API interface: Microservices may communicate with each other components through well-defined APIs or interfaces, using lightweight protocols such as representational state transfer (REST) or messaging.

Data storage: A microservice subsystem may be responsible for its own data storage, which may be in the form of a database, cache, or other storage mechanism (e.g., using the database 134). This enables a microservice subsystem to operate independently of other microservices.

Service discovery: Microservice subsystems may find and communicate with other microservice subsystems of the server system 104. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

Figure 3:
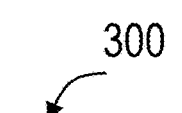
FIG. 3 is a block diagram showing an example of creating a graph workspace, according to some examples.

FIG. 3 is a block diagram showing an example 300 of creating a graph workspace, according to some examples. One or more of the various functions described in the example 300 may be implemented by, for example, the graph workspace system 130 of FIG. 1 or FIG. 2 or a similar graph workspace system.

The example 300 illustrates creation of a graph workspace A 314 and a graph workspace B 316 on a data collection 308 in a graph workspace system 306. User A 302 provides a user command to create the graph workspace A 314 on the data collection 308. In response to the user command, the graph workspace system 306 determines whether indexes on the data collection 308 for the graph workspace A 314 have been created. In this example, hash index 310 is an existing hash index created on the data collection 308. An adjacency index 312 has not been created on the data collection 308. Accordingly, the graph workspace system 306 determines the adjacency index 312 has not been created and automatically creates the adjacency index 312 on the data collection 308. The graph workspace system 306 creates the graph workspace A 314 referencing the hash index 310 and the adjacency index 312.

User B 304 provides a user command to create the graph workspace B 316 on the data collection 308. In response to the user command, the graph workspace system 306 determines whether indexes on the data collection 308 for the graph workspace B 316 have been created. In this example, hash index 310 is an existing hash index created on the data collection 308. The adjacency index 312 is an existing adjacency index that was automatically created on the data collection 308 in response to the user command to create the graph workspace A 314. Accordingly, the graph workspace system 306 determines the hash index 310 and the adjacency index 312 have been created and creates the graph workspace B 316 referencing the hash index 310 and the adjacency index 312.

Figure 4:
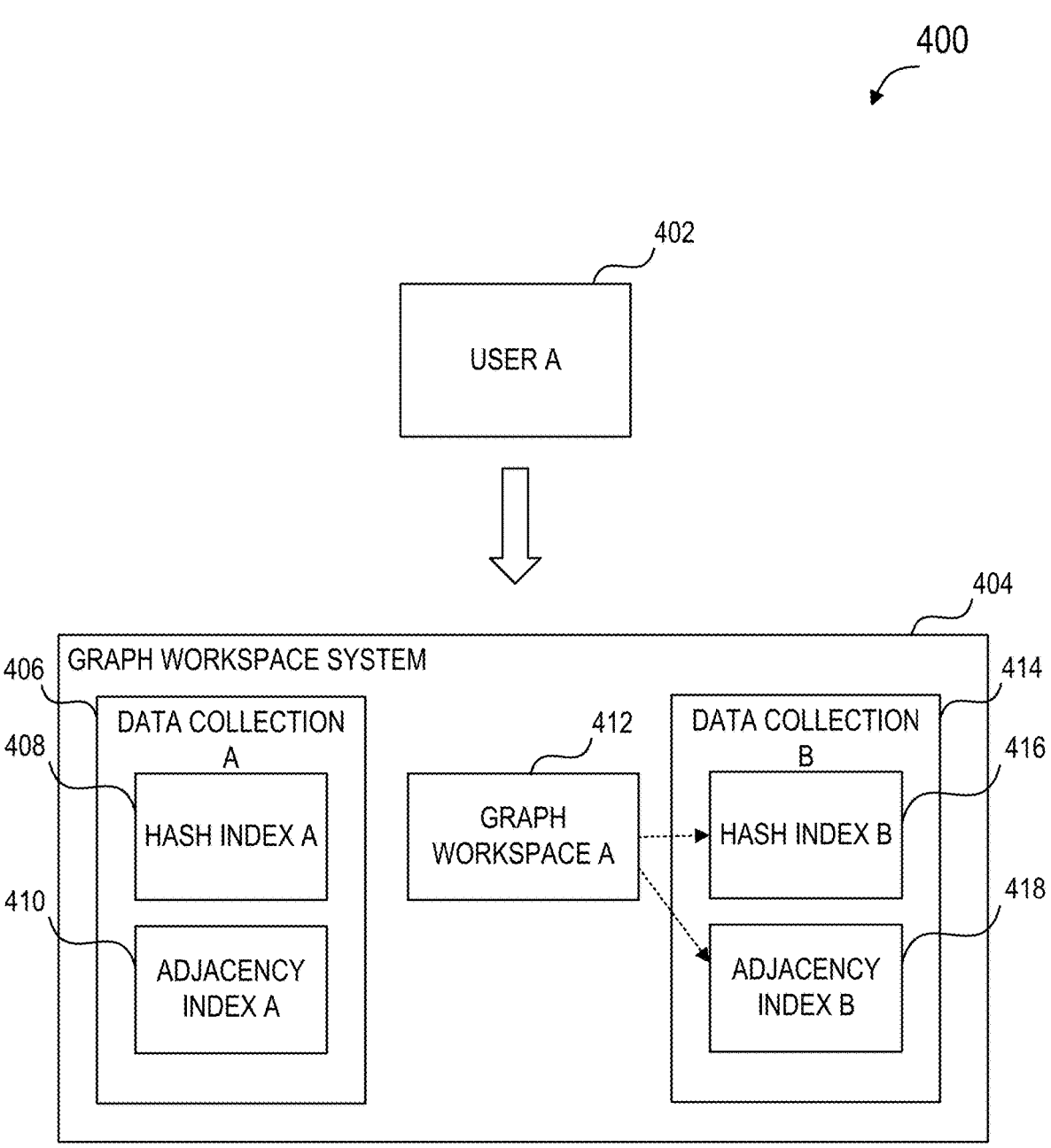
FIG. 4 is a block diagram showing an example of replacing a graph workspace, according to some examples.

FIG. 4 is a block diagram showing an example 400 of replacing a graph workspace, according to some examples. One or more of the various functions described in the example 400 may be implemented by, for example, the graph workspace system 130 of FIG. 1 or FIG. 2 or a similar graph workspace system.

The example 400 illustrates replacing of a graph workspace A 412 created for data collection A 406 with the graph workspace A 412 created for data collection B 414. User A 402 provides a user command to create the graph workspace A 412 on the data collection B 414. In this example, the graph workspace A 412 was previously created for data collection A 406. A hash index A 408 and an adjacency index A 410 were automatically created for the graph workspace A 412. In response to the user command, the graph workspace system 404 determines whether indexes on the data collection B 414 for the graph workspace A 412 have been created. In this example, no indexes have been created on the data collection B 414. Accordingly, the graph workspace system 404 determines that no indexes have been created on the data collection B 414 and automatically creates a hash index B 416 and an adjacency index B 418 on the data collection B. The graph workspace system 404 drops the graph workspace A 412 on the data collection A 406 and creates the graph workspace A 412 on the data collection B 414 as a replacement, referencing the hash index B 416 and the adjacency index B 418. Based on the graph workspace A 412 on the data collection A 406 being dropped, the graph workspace system 404 determines whether the hash index A 408 and the adjacency index A 410, which were automatically created, are referenced by any graph workspace. In this example, only graph workspace A 412 was referencing the hash index A 408 and the adjacency index A 410. So, the graph workspace system 404 determines that no graph workspaces are referencing the hash index A 408 and the adjacency index A 410. Based on this determination, the graph workspace system 404 drops the hash index A 408 and the adjacency index A 410.

Figure 5B:
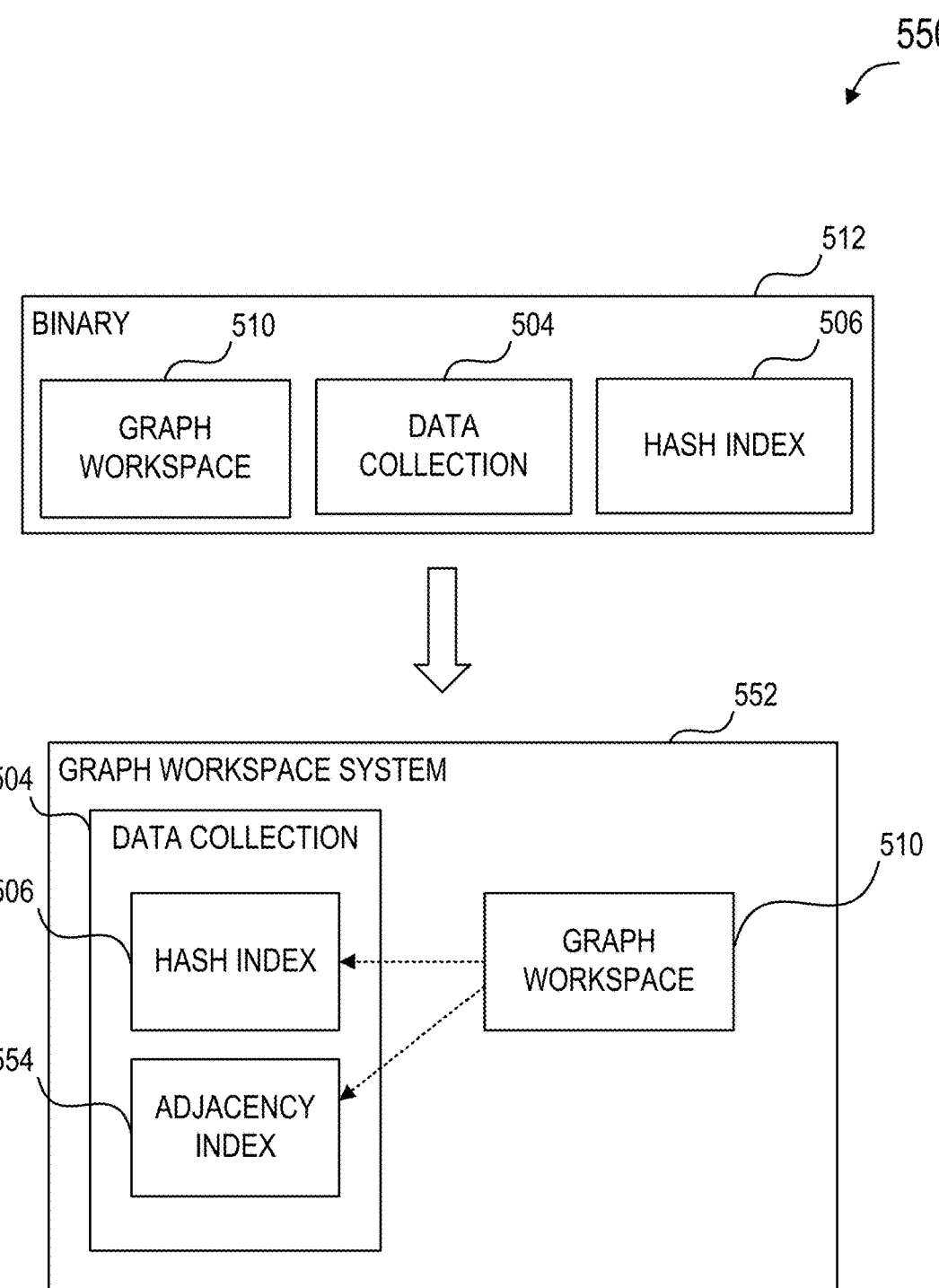

FIGS. 5A-5B are block diagrams showing examples of exporting and importing a graph workspace, according to some examples. One or more of the various functions described in these examples may be implemented by, for example, the graph workspace system 130 of FIG. 1 or FIG. 2 or a similar graph workspace system.

In FIG. 5A, the example 500 illustrates exporting a graph workspace 510 created for data collection 504. When the graph workspace 510 was created for the data collection 504, a hash index 506 was already created on the data collection 504 and an adjacency index 508 was automatically created on the adjacency index 508. The graph workspace 510 was created referencing the hash index 506 and the adjacency index 508. In response to a user command to export the graph workspace 510, the graph workspace system 502 generates a binary 512 that includes the graph workspace 510, the data collection 504, and the hash index 506. The adjacency index 508, which was automatically created, is not included in the binary 512.

In FIG. 5B, the example 550 illustrates importing the binary 512. In response to a user command to import the graph workspace 510, the graph workspace system 552 imports the binary 512. The binary 512 includes the graph workspace 510, the data collection 504, and the hash index 506. The graph workspace system 552 identifies indexes on the data collection 504 that are imported in the binary 512. Since the hash index 506 is included in the binary 512 and no adjacency index is included in the binary 512, the graph workspace system 552 automatically creates an adjacency index 554. The graph workspace 510 references the hash index 506 and the adjacency index 554.

Figure 6A:
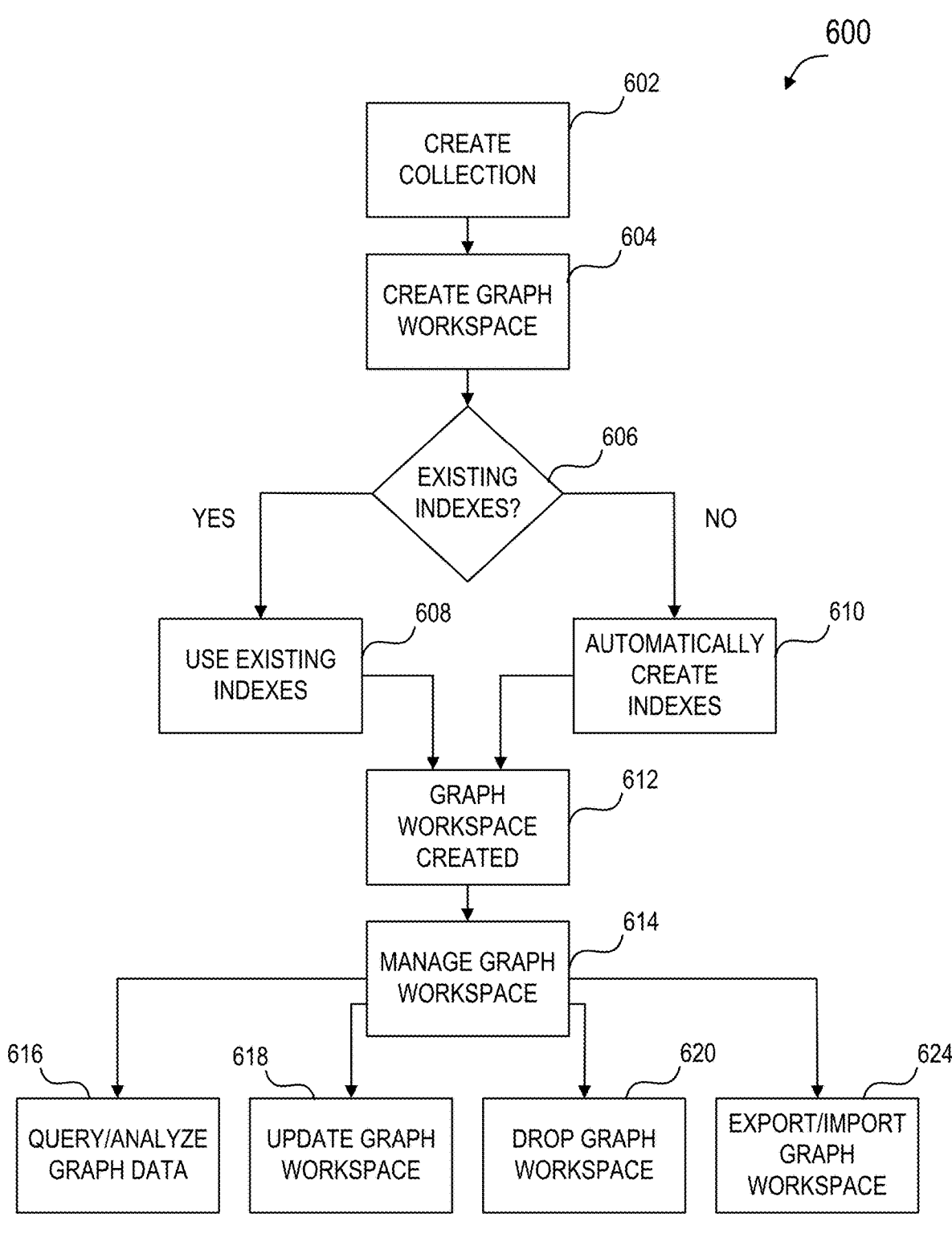
FIGS. 6A-6B are flowcharts showing example methods, according to some examples.
Figure 6B:
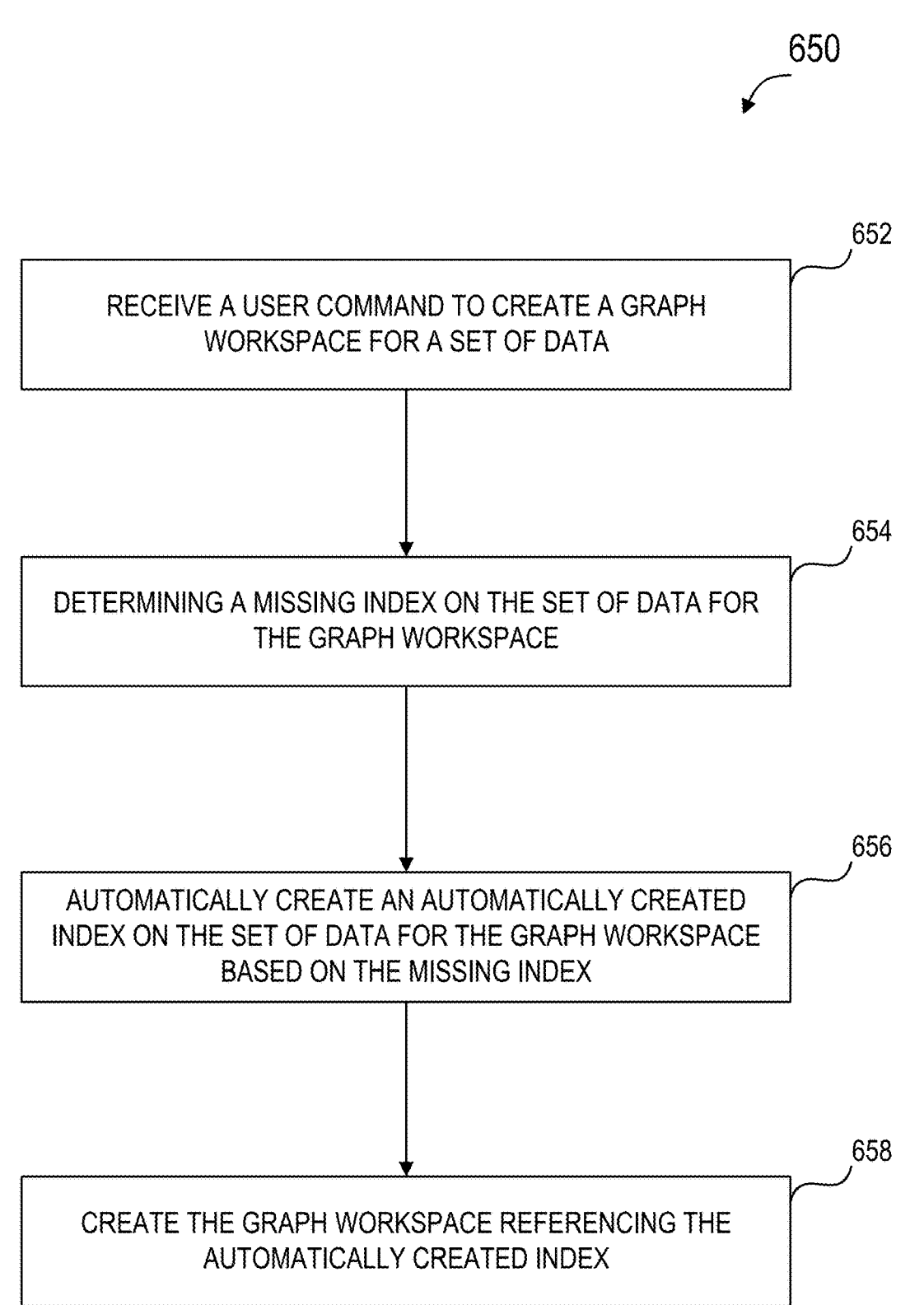

FIGS. 6A-6B are flowcharts showing example methods, according to some examples. One or more of the functions described in the example methods may be implemented by, for example, the graph workspace system 130 of FIG. 1 or FIG. 2 or a similar graph workspace system. Although the flowcharts depict particular sequences of operations, the sequences may be altered without departing from the scope of the subject matter disclosed herein. For example, some of the operations depicted may be performed in parallel or in a different sequence without materially affecting the functions described in the example methods.

In FIG. 6A, the example method 600 includes operations performed by a graph workspace system associated with creating a graph workspace. At operation 602, the graph workspace system creates a data collection. For example, the data collection is created in response to a user command to create a data collection of a set of data in a database. At operation 604, the graph workspace system creates a graph workspace. For example, the graph workspace system receives a user command to create a graph workspace for the data collection. At operation 606, the graph workspace system determines existing indexes on the data collection. For example, the graph workspace system determines if a hash index exists on the data collection and if an adjacency index exists on the data collection. If the graph workspace determines there are existing indexes on the data collection, then at operation 608, the graph workspace system uses the existing indexes. For example, the graph workspace system uses an existing hash index and an existing adjacency index for creating the graph workspace. If the graph workspace determines there are no existing indexes on the data collection, then at operation 610, the graph workspace system automatically creates indexes. For example, the graph workspace system automatically creates a hash index and automatically creates an adjacency index on the data collection. At operation 612, the graph workspace is created. For example, the graph workspace is created referencing the existing hash index and the existing adjacency index, the existing hash index and the automatically created adjacency index, or the automatically created hash index and the automatically created adjacency index. At operation 614, the graph workspace system manages the graph workspace. Managing the graph workspace involves various operations. At operation 616, the graph workspace system facilitates querying and analyzing graph data using the graph workspace. For example, the graph workspace system facilitates performing graph traversals on the graph workspace. At operation 618, the graph workspace system updates the graph workspace. For example, the graph workspace system can modify the existing hash index or modify the existing adjacency index and refresh the graph workspace. At operation 620, the graph workspace system drops the graph workspace. For example, the graph workspace system drops the graph workspace system and drops the automatically created hash index and the automatically created adjacency index if no other graph workspaces are referencing the automatically created hash index and the automatically created adjacency index. At operation 624, the graph workspace system exports and imports the graph workspace. For example, the graph workspace system exports the graph workspace in a binary that includes existing indexes and does not include automatically created indexes.

In FIG. 6B, the example method 650 includes operations performed by a graph workspace system. At operation 652, the graph workspace system receives a user command to create a graph workspace for a set of data. At operation 654, the graph workspace system determines a missing index on the set of data for the graph workspace. At operation 656, the graph workspace system automatically creates an automatically created index on the set of data for the graph workspace based on the missing index. At operation 658, the graph workspace system creates the graph workspace referencing the automatically created index.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one memory that stores instructions; and one or more processors configured by the instructions to perform operations comprising: receiving a first user command to create a first graph workspace for a first set of data; determining a first missing index on the first set of data for the first graph workspace; automatically creating a first automatically created index on the first set of data for the first graph workspace based on the first missing index; and creating the first graph workspace referencing the first automatically created index.

In Example 2, the subject matter of Example 1 comprises receiving a second user command to drop the first graph workspace; identifying a number of second graph workspaces referencing the first automatically created index; and dropping the first automatically created index based on the number of second graph workspaces referencing the first automatically created index being less than a threshold number.

In Example 3, the subject matter of Example 2 comprises wherein identifying the number of second graph workspaces comprises: iterating through data objects defined for the first set of data; and incrementing a counter for each data object of the data objects that references the first automatically created index.

In Example 4, the subject matter of any of Example 1-3 comprises receiving a second user command to create a second graph workspace for the first set of data; identifying the first automatically created index on the first set of data; and creating the second graph workspace referencing the first automatically created index.

In Example 5, the subject matter of any of Examples 1-4 comprises determining a first existing index on the first set of data for the first graph workspace, the first existing index not being identified in the first user command; and causing the first graph workspace to reference the first existing index and the first automatically created index.

In Example 6, the subject matter of any of Examples 1-5 comprises wherein the first automatically created index identifies vertices in the first set of data, the operations further comprising: automatically creating a second automatically created index, the second automatically created index identifying connections between the vertices in the first set of data, the second automatically created index referencing the first automatically created index; and causing the first graph workspace to reference the first automatically created index and the second automatically created index.

In Example 7, the subject matter of any of Examples 1-6 comprises receiving a second user command to replace the first graph workspace with a second graph workspace for a second set of data; determining a second missing index on the second set of data for the second graph workspace; automatically creating a second automatically created index on the second set of data for the second graph workspace based on the second missing index; creating the second graph workspace referencing the second automatically created index; and dropping the first graph workspace and the first automatically created index.

In Example 8, the subject matter of any of Examples 1-7 comprises receiving a second user command to export the first graph workspace; and generating a binary comprising the first graph workspace and the first set of data, the binary excluding the first automatically created index.

In Example 9, the subject matter of any of Examples 1-8 comprises receiving a second user command to import a second graph workspace; receiving a binary comprising the second graph workspace and a second set of data; determining a second missing index in the binary; and automatically creating a second automatically created index on the second set of data, the second graph workspace referencing the second automatically created index.

In Example 10, the subject matter of any of Examples 1-9 comprises locking the first set of data based on the first automatically created index; and unlocking the first set of data based on the first automatically created index being created.

In Example 11, the subject matter of any of Examples 1-10 comprises determining a user who provided the first user command has privileges to create indexes on the first set of data, wherein creating the first graph workspace is based on the user having the privileges to create indexes on the first set of data.

In Example 12, the subject matter of any of Examples 1-11 comprises determining a user who provided the first user command does not have privileges to drop indexes on the first set of data; and denying a second user command to replace the first graph workspace with a second graph workspace for a second set of data.

In Example 13, the subject matter of any of Examples 1-12 comprises wherein the first automatically created index follows a naming scheme identifying the first automatically created index as a system index.

Example 14 is a method comprising: receiving a first user command to create a first graph workspace for a first set of data; determining a first missing index on the first set of data for the first graph workspace; automatically creating a first automatically created index on the first set of data for the first graph workspace based on the first missing index; and creating the first graph workspace referencing the first automatically created index.

In Example 15, the subject matter of Example 14 comprises receiving a second user command to drop the first graph workspace; identifying a number of second graph workspaces referencing the first automatically created index; and dropping the first automatically created index based on the number of second graph workspaces referencing the first automatically created index being less than a threshold number.

In Example 16, the subject matter of Example 15 comprises wherein identifying the number of second graph workspaces comprises: iterating through data objects defined for the first set of data; and incrementing a counter for each data object of the data objects that references the first automatically created index.

In Example 17, the subject matter of any of Examples 14-16 comprises receiving a second user command to create a second graph workspace for the first set of data; identifying the first automatically created index on the first set of data; and creating the second graph workspace referencing the first automatically created index.

Example 18 is one or more non-transitory computer-readable media storing computer-executable instructions that, when executed by a computing system, cause the computing system to perform operations comprising: receiving a first user command to create a first graph workspace for a first set of data; determining a first missing index on the first set of data for the first graph workspace; automatically creating a first automatically created index on the first set of data for the first graph workspace based on the first missing index; and creating the first graph workspace referencing the first automatically created index.

In Example 19, the subject matter of Example 18 comprises receiving a second user command to drop the first graph workspace; identifying a number of second graph workspaces referencing the first automatically created index; and dropping the first automatically created index based on the number of second graph workspaces referencing the first automatically created index being less than a threshold number.

In Example 20, the subject matter of Example 19 comprises wherein identifying the number of second graph workspaces comprises: iterating through data objects defined for the first set of data; and incrementing a counter for each data object of the data objects that references the first automatically created index.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 7:
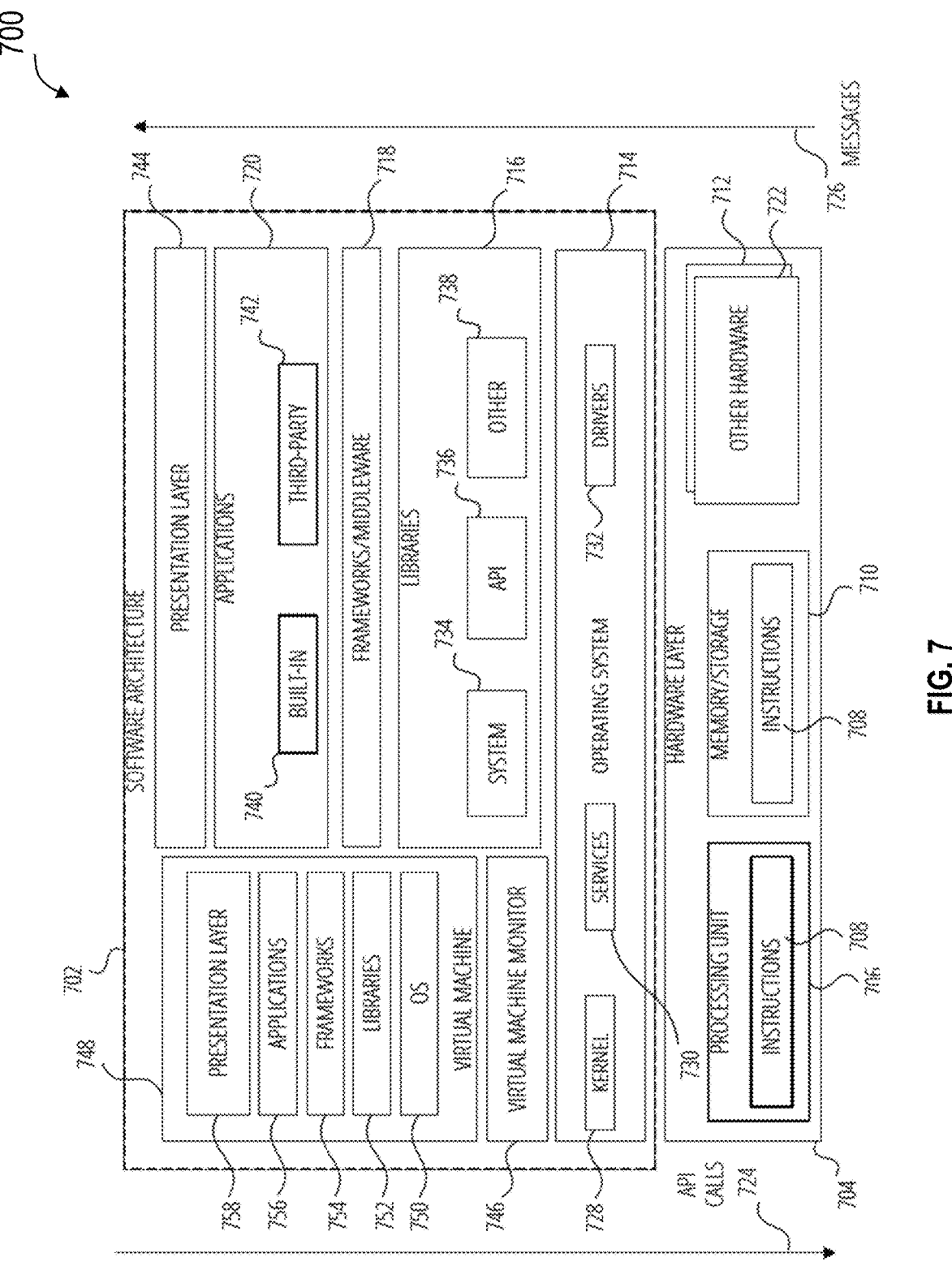
FIG. 7 is a block diagram showing a software architecture for a computing device, according to some examples.

FIG. 7 is a block diagram 700 showing a software architecture 702 for a computing device, according to some examples. The software architecture 702 may be used in conjunction with various hardware architectures, for example, as described herein. FIG. 7 is merely a non-limiting illustration of a software architecture, and many other architectures may be implemented to facilitate the functionality described herein. A representative hardware layer 704 is illustrated and can represent, for example, any of the above referenced computing devices. In some examples, the hardware layer 704 may be implemented according to the architecture of the computer system of FIG. 8.

The representative hardware layer 704 comprises one or more processing units 706 having associated executable instructions 708. Executable instructions 708 represent the executable instructions of the software architecture 702, including implementation of the methods, modules, subsystems, and components, and so forth described herein and may also include memory and/or storage modules 710, which also have executable instructions 708. Hardware layer 704 may also comprise other hardware as indicated by other hardware 712 and other hardware 722 which represent any other hardware of the hardware layer 704, such as the other hardware illustrated as part of the software architecture 702.

In the architecture of FIG. 7, the software architecture 702 may be conceptualized as a stack of layers where each layer provides particular functionality. For example, the software architecture 702 may include layers such as an operating system 714, libraries 716, frameworks/middleware layer 718, applications 720, and presentation layer 744. Operationally, the applications 720 or other components within the layers may invoke API calls 724 through the software stack and access a response, returned values, and so forth illustrated as messages 726 in response to the API calls 724. The layers illustrated are representative in nature and not all software architectures have all layers. For example, some mobile or special purpose operating systems may not provide a frameworks/middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of an interrupt and, in response, cause the software architecture 702 to pause its current processing and execute an interrupt service routine (ISR) when an interrupt is accessed.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 716 may provide a common infrastructure that may be utilized by the applications 720 or other components or layers. The libraries 716 typically provide functionality that allows other software modules to perform tasks in an easier fashion than to interface directly with the underlying operating system 714 functionality (e.g., kernel 728, services 730 or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks/middleware layer 718 may provide a higher-level common infrastructure that may be utilized by the applications 720 or other software components/modules. For example, the frameworks/middleware layer 718 may provide various graphic user interface (GUI) functions, high-level resource management, high-level location services, and so forth. The frameworks/middleware layer 718 may provide a broad spectrum of other APIs that may be utilized by the applications 720 or other software components/modules, some of which may be specific to a particular operating system or platform.

The applications 720 include built-in applications 740 or third-party applications 742. Examples of representative built-in applications 740 may include, but are not limited to, a contacts application, a browser application, a book reader application, a location application, a media application, a messaging application, or a game application. Third-party applications 742 may include any of the built-in applications as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 742 may invoke the API calls 724 provided by the mobile operating system such as operating system 714 to facilitate functionality described herein.

The applications 720 may utilize built in operating system functions (e.g., kernel 728, services 730 or drivers 732), libraries (e.g., system libraries 734, API libraries 736, and other libraries 738), and frameworks/middleware layer 718 to create user interfaces to interact with users of the system. Alternatively, or additionally, in some systems, interactions with a user may occur through a presentation layer, such as presentation layer 744. In these systems, the application/ module "logic" can be separated from the aspects of the application/module that interact with a user.

Some software architectures utilize virtual machines. In the example of FIG. 7, this is illustrated by virtual machine 748. A virtual machine creates a software environment where applications/modules can execute as if they were executing on a hardware computing device. A virtual machine is hosted by a host operating system (operating system 714) and typically, although not always, has a virtual machine monitor 746, which manages the operation of the virtual machine as well as the interface with the host operating system (e.g., operating system 714). A software architecture executes within the virtual machine 748 such as an operating system 750, libraries 752, frameworks/middleware 754, applications 756 or presentation layer 758. These layers of software architecture executing within the virtual machine 748 can be the same as corresponding layers previously described or may be different.

Certain examples are described herein as including logic or a number of components, modules, or mechanisms. Modules or components may constitute either software modules/components (e.g., code embodied (1) on a non-transitory machine-readable medium or (2) in a transmission signal) or hardware-implemented modules/components. A hardware-implemented module/component is a tangible unit capable of performing certain operations and may be configured or arranged in a certain manner. In examples, one or more computer systems (e.g., a standalone, client, or server computer system) or one or more hardware processors may be configured by software (e.g., an application or application portion) as a hardware-implemented module/component that operates to perform certain operations as described herein.

In various examples, a hardware-implemented module/ component may be implemented mechanically or electronically. For example, a hardware-implemented module/component may comprise dedicated circuitry or logic that is permanently configured (e.g., as a special-purpose processor, such as a field programmable gate array (FPGA) or an application-specific integrated circuit (ASIC)) to perform certain operations. A hardware-implemented module/component may also comprise programmable logic or circuitry (e.g., as encompassed within a general-purpose processor or another programmable processor) that is temporarily configured by software to perform certain operations.

Accordingly, the term "hardware-implemented module" or "hardware-implemented component" should be understood to encompass a tangible entity, be that an entity that is physically constructed, permanently configured (e.g., hardwired), or temporarily or transitorily configured (e.g., programmed) to operate in a certain manner or to perform certain operations described herein. Considering examples in which hardware-implemented modules/components are temporarily configured (e.g., programmed), each of the hardware-implemented modules/components need not be configured or instantiated at any one instance in time. For example, where the hardware-implemented modules/components comprise, a general-purpose processor configured using software, the general-purpose processor may be configured as respective different hardware-implemented modules/components at different times. Software may accordingly configure a processor, for example, to constitute a particular hardware-implemented module/component at one instance of time and to constitute a different hardware-implemented module/component at a different instance of time.

Hardware-implemented modules/components can provide information to, and receive information from, other hardware-implemented modules/components. Accordingly, the described hardware-implemented modules/components may be regarded as being communicatively coupled. Where multiple of such hardware-implemented modules/components exist contemporaneously, communications may be achieved through signal transmission (e.g., over appropriate circuits and buses that connect the hardware-implemented modules/components). In examples in which multiple hardware-implemented modules/components are configured or instantiated at different times, communications between such hardware-implemented modules/components may be achieved, for example, through the storage and retrieval of information in memory structures to which the multiple hardware-implemented modules/components have access. For example, one hardware-implemented module/component may perform an operation and store the output of that operation in a memory device to which it is communicatively coupled. A further hardware-implemented module/ component may then, at a later time, access the memory device to retrieve and process the stored output.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules/components that operate to perform one or more operations or functions. The modules/components referred to herein may, in some examples, comprise processor-implemented modules/components.

Similarly, the methods described herein may be at least partially processor implemented. For example, at least some of the operations of a method may be performed by one or more processors or processor-implemented modules/components. The performance of certain of the operations may be distributed among the one or more processors, not only residing within a single machine, but deployed across a number of machines.

The one or more processors may also operate to support performance of the relevant operations in a "cloud computing" environment or as a "software as a service (SaaS)." For example, at least some of the operations may be performed by a group of computers (as examples of machines including processors), these operations being accessible via a network (e.g., the Internet) and via one or more appropriate interfaces (e.g., APIs).

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

Figure 8:
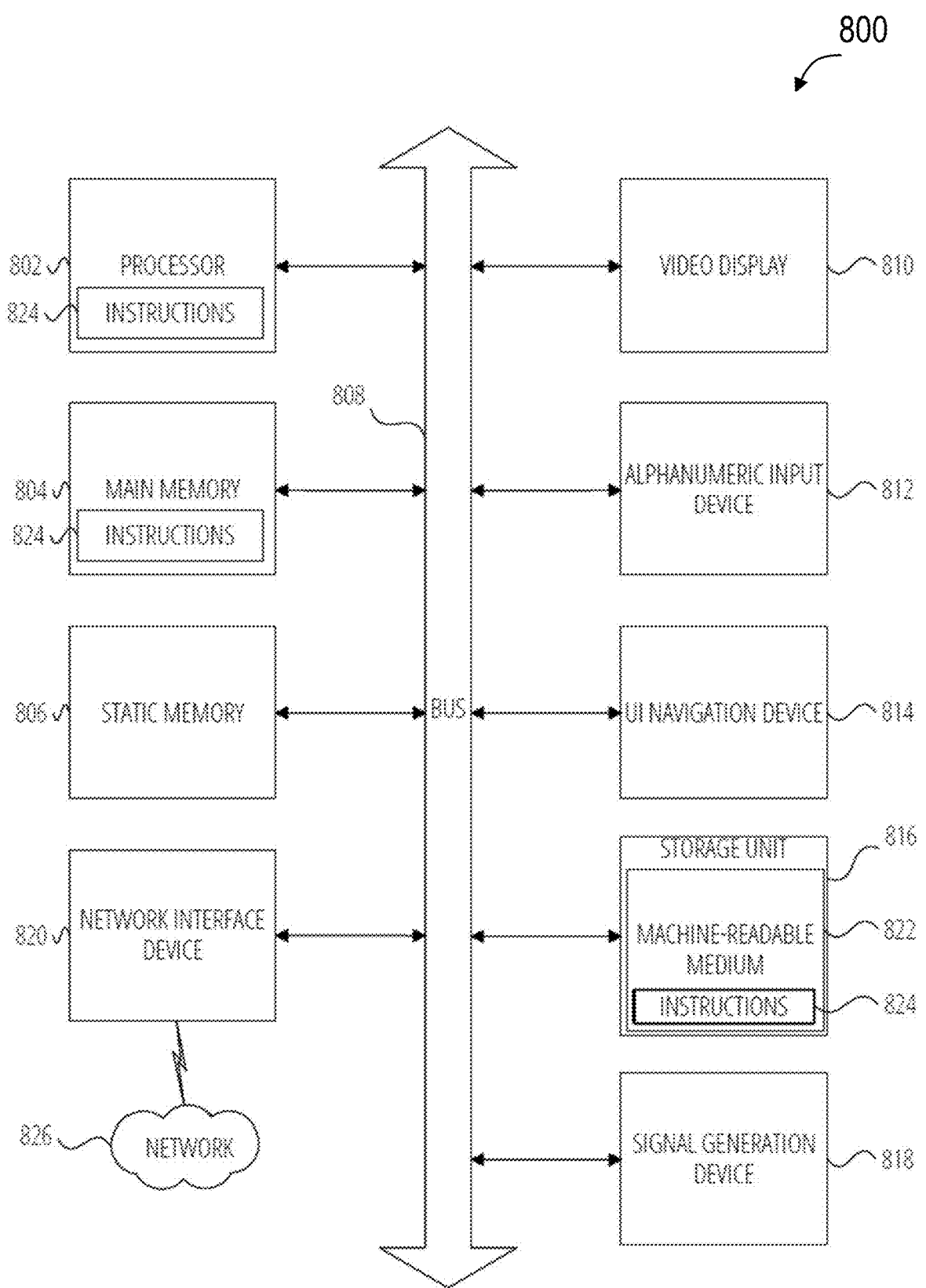
FIG. 8 is a block diagram of a machine in the form of a computer system, according to some examples, within which instructions may be executed for causing the machine to perform any one or more of the methodologies discussed herein.

FIG. 8 is a block diagram of a machine in the example form of a computer system 800 within which instructions 824 may be executed for causing the machine to perform any one or more of the methodologies discussed herein. In alternative examples, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a GPU, or both), a primary or main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a UI navigation (or cursor control) device 814 (e.g., a mouse), a storage unit 816, a signal generation device 818 (e.g., a speaker), and a network interface device 820.

As used herein, the term "processor" may refer to any one or more circuits or virtual circuits (e.g., a physical circuit emulated by logic executing on an actual processor) that manipulates data values according to control signals (e.g., commands, opcodes, machine code, control words, macro-instructions, etc.) and which produces corresponding output signals that are applied to operate a machine. A processor may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof. A processor may be a multi-core processor having two or more independent processors (sometimes referred to as "cores") that may execute instructions contemporaneously. Multi-core processors may contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. A processor may be emulated in software, running on a physical processor, as a virtual processor or virtual circuit. The virtual processor may behave like an independent processor but is implemented in software rather than hardware.

The storage unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 or within the processor 802 during execution thereof by the computer system 800, with the main memory 804 and the processor 802 also each constituting a machine-readable medium 822.

While the machine-readable medium 822 is shown in accordance with some examples to be a single medium, the term "machine-readable medium" may include a single medium or multiple media (e.g., a centralized or distributed database, or associated caches and servers) that store the one or more instructions 824 or data structures. The term "machine-readable medium" shall also be taken to include any tangible medium that is capable of storing, encoding, or carrying instructions 824 for execution by the machine and that cause the machine to perform any one or more of the methodologies of the present disclosure, or that is capable of storing, encoding, or carrying data structures utilized by or associated with such instructions 824. The term "machine-readable medium" shall accordingly be taken to include, but not be limited to, solid-state memories, and optical and magnetic media. Specific examples of a machine-readable medium 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

The instructions 824 may further be transmitted or received over a communications network 826 using a transmission medium. The instructions 824 may be transmitted using the network interface device 820 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding, or carrying instructions 824 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the subject matter may be referred to herein, individually, or collectively, by the term "example" merely for convenience and without intending to voluntarily limit the scope of this application to any single example or concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. Except as otherwise indicated, the word "or" in reference to a list of two or more items, covers all of the following interpretations of the word: any one of the items in the list, all of the items in the list, and any combination of the items in the list.

Although some examples, such as those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence. The term "operation" is used to refer to elements in the drawings of this disclosure for ease of reference and it will be appreciated that each "operation" may identify one or more operations, processes, actions, or steps, and may be performed by one or multiple components.

What is claimed is:

1. A system comprising:
at least one memory that stores instructions; and
one or more processors configured by the instructions to perform operations comprising:
 receiving a first user command to create a first graph workspace for a first set of data;
 determining a first missing index on the first set of data for the first graph workspace;
 automatically creating a first automatically created index on the first set of data for the first graph workspace based on the first missing index; and
 creating the first graph workspace referencing the first automatically created index.

2. The system of claim 1, the operations further comprising:
 receiving a second user command to drop the first graph workspace;
 identifying a number of second graph workspaces referencing the first automatically created index; and
 dropping the first automatically created index based on the number of second graph workspaces referencing the first automatically created index being less than a threshold number.

3. The system of claim 2, wherein identifying the number of second graph workspace s comprises:
 iterating through data objects defined for the first set of data; and
 incrementing a counter for each data object of the data objects that references the first automatically created index.

4. The system of claim 1, the operations further comprising:
 receiving a second user command to create a second graph workspace for the first set of data;
 identifying the first automatically created index on the first set of data; and
 creating the second graph workspace referencing the first automatically created index.

5. The system of claim 1, the operations further comprising:
 determining a first existing index on the first set of data for the first graph workspace, the first existing index not being identified in the first user command; and causing the first graph workspace to reference the first existing index and the first automatically created index.

6. The system of claim 1, wherein the first automatically created index identifies vertices in the first set of data, the operations further comprising:

automatically creating a second automatically created index, the second automatically created index identifying connections between the vertices in the first set of data, the second automatically created index referencing the first automatically created index; and causing the first graph workspace to reference the first automatically created index and the second automatically created index.

7. The system of claim 1, the operations further comprising:

receiving a second user command to replace the first graph workspace with a second graph workspace for a second set of data;

determining a second missing index on the second set of data for the second graph workspace;

automatically creating a second automatically created index on the second set of data for the second graph workspace based on the second missing index;

creating the second graph workspace referencing the second automatically created index; and dropping the first graph workspace and the first automatically created index.

8. The system of claim 1, the operations further comprising:

receiving a second user command to export the first graph workspace; and generating a binary comprising the first graph workspace and the first set of data, the binary excluding the first automatically created index.

9. The system of claim 1, the operations further comprising:

receiving a second user command to import a second graph workspace;

receiving a binary comprising the second graph workspace and a second set of data;

determining a second missing index in the binary; and automatically creating a second automatically created index on the second set of data, the second graph workspace referencing the second automatically created index.

10. The system of claim 1, the operations further comprising:

locking the first set of data based on the first automatically created index; and unlocking the first set of data based on the first automatically created index being created.

11. The system of claim 1, the operations further comprising:

determining a user who provided the first user command has privileges to create indexes on the first set of data, wherein creating the first graph workspace is based on the user having the privileges to create indexes on the first set of data.

12. The system of claim 1, the operations further comprising:

determining a user who provided the first user command does not have privileges to drop indexes on the first set of data; and denying a second user command to replace the first graph workspace with a second graph workspace for a second set of data.

13. The system of claim 1, wherein the first automatically created index follows a naming scheme identifying the first automatically created index as a system index.

14. A method comprising:

receiving a first user command to create a first graph workspace for a first set of data;

determining a first missing index on the first set of data for the first graph workspace;

automatically creating a first automatically created index on the first set of data for the first graph workspace based on the first missing index; and creating the first graph workspace referencing the first automatically created index.

15. The method of claim 14, further comprising:

receiving a second user command to drop the first graph workspace;

identifying a number of second graph workspaces referencing the first automatically created index; and dropping the first automatically created index based on the number of second graph workspaces referencing the first automatically created index being less than a threshold number.

16. The method of claim 15, wherein identifying the number of second graph workspaces comprises:

iterating through data objects defined for the first set of data; and incrementing a counter for each data object of the data objects that references the first automatically created index.

17. The method of claim 14, further comprising:

receiving a second user command to create a second graph workspace for the first set of data;

identifying the first automatically created index on the first set of data; and creating the second graph workspace referencing the first automatically created index.

18. One or more non-transitory computer-readable media storing computer-executable instructions that, when executed by a computing system, cause the computing system to perform operations comprising:

receiving a first user command to create a first graph workspace for a first set of data;

determining a first missing index on the first set of data for the first graph workspace;

automatically creating a first automatically created index on the first set of data for the first graph workspace based on the first missing index; and creating the first graph workspace referencing the first automatically created index.

19. The one or more non-transitory computer-readable media of claim 18, the operations further comprising:

receiving a second user command to drop the first graph workspace;

identifying a number of second graph workspaces referencing the first automatically created index; and dropping the first automatically created index based on the number of second graph workspaces referencing the first automatically created index being less than a threshold number.

20. The one or more non-transitory computer-readable media of claim 19, wherein identifying the number of second graph workspaces comprises:

iterating through data objects defined for the first set of data; and incrementing a counter for each data object of the data objects that references the first automatically created index.

\* \* \* \* \*